Patented June 12, 1951

2,556,316

UNITED STATES PATENT OFFICE 2,556,316

METHOD OF PREPARING A MANGANESE CHELATED COMPOUND

Groves H. Cartledge, Bristol, Tenn., assignor, by mesne assignments, to Cornell Aeronautical Laboratory, Inc., a corporation of New York No Drawing. Application March 19, 1948, Serial No. 15,965

5 Claims. (Cl. 260—429)

This invention relates to a method of making manganese chelated compounds of certain 2,4-diketones, especially manganese (III) triacetylacetonate, $Mn(C_5H_7O_2)_3$. Previous methods have been based upon the prior preparation of hydrated manganic oxide which was then caused to react with the diketone. Such methods have been slow and indirect. When a trivalent ion forms stable soluble salts they may be used without formation of the hydroxide. Such methods are not applicable to trivalent manganese, however, since it does not form soluble simple salts. In such a case the method disclosed herein is particularly advantageous.

I have discovered that it is possible to eliminate the separate preparation of manganic oxide by using a new procedure in which bivalent manganese is oxidized to the trivalent state in the presence of a diketone. Under these conditions the manganic ions produced by the oxidation-reduction reaction combine immediately with the radical of the diketone, forming the desired product. The following reaction has been carried out with acetylacetone ($C_5H_8O_2$) and typifies the improved process:

In the original laboratory experiments demonstrating this reaction there were used a solution of manganese sulphate as follows, $MnSO_4.4H_2O$, 8.92 g.+40 cc. $H_2O$, which I will refer to as solution #1; and a solution of potassium permanganate as follows, $KMnO_4$, 1.58 g.+40 cc. $H_2O$, which I will refer to as solution #2. To solution #1 were added 20 cc. of commercial acetylacetone and 1 cc. of approximately 10% ammonia. The solutions were at room temperature. Just prior to carrying out the reaction, 10 cc. of approximately 10% ammonia were added to solution #2, whereupon solution #2 was added to solution #1 dropwise and with mechanical agitation. Reaction began at once, with production of a brown coloration followed soon by separation of the black crystalline product. At the end of the reaction the solution had a pH of approximately 5. An additional 1 cc. of 10% ammonia was added, changing the pH to 5.5. The mixture was cooled to 10° C. for a short time. The product of the reaction was a nearly black, lustrous crystalline precipitate. This was filtered, washed with small portions of water and three small portions of ethyl ether. The product was then dried by exposure to air at room temperature. The yield in this particular experiment was 12.7 grams, or 73% of the theoretical amount. Under the microscope the product was seen to be microscopically homogeneous and well crystallized. Analysis of various samples gave a manganese content of from 15.34% to 15.37%, as compared with a theoretical value of 15.59%.

The reacting proportions shown above do not correspond exactly to the amounts represented in the chemical equation. Experiments have demonstrated that the best results are obtained if the acidity at the end of the reaction is controlled so that the pH lies between 5 and 6.5. The commercial acetylacetone used was not pure, so that a slight excess was used. The amount of alkali required depends somewhat on the free acetic acid present in the acetylacetone. Experiments have shown that sodium hydroxide may be used in place of ammonia, though the high solubility of ammonium sulfate makes ammonia preferable. In any event, in order to maintain the proper pH between 5 and 6.5 a small amount of alkali should be added. Redistilled commercial acetylacetone will yield a clear liquid which will give a higher yield of the chelate. Commercial acetylacetone is reddish in color due to the iron impurity and is also slightly acid so that it needs to be neutralized with a base. Upon allowing the cooled mixture to stand the yield can be increased above 73%. By prolonged cooling and standing a yield up to 90% of the product has been obtained.

A preferred practice has been to keep solution #1 (manganese sulphate) in the cooled container, allowing solution #2 (potassium permanganate), solution #3 (acetylacetone) and solution #4 (ammonium hydroxide) to be added simultaneously and slowly to solution #1 with the pH maintained around 5.5. The container may be kept cool by ice around it, or in a continuous commercial process by suitable mechanical cooling means. The mixture is mechanically agitated to aid in the reaction and in the yield of the product. The black crystalline product separates out and settles in the bottom. It can be quickly collected by filtering with suction and washing rapidly with water. A second wash can be with alcohol so that the product may dry quickly, which aids in preventing decomposition in the air. It is then thoroughly dried in a desiccator, preferably under vacuum suction. The resulting product is stable and can be readily packaged as it does not oxidize in air.

In the process it will be noted that whereas acetylacetone is directly oxidized by potassium permanganate under ordinary conditions, under the conditions of this particular process the bulk of the acetylacetone escapes oxidation by virtue of the vigorous reducing properties of manganous salts in the presence of complex-forming compounds.

Since the diketones are oxidized by potassium permanganate, the success or failure of the method depends upon the relative rates of oxidation of the diketone and the manganous salt. The reaction conditions described permit preferential oxidation of the manganous salt when using acetylacetone or benzoylacetone, but the method is not necessarily applicable to all similarly constituted ketones. Thus, it has been found that ethyl acetoacetate is so rapidly oxidized by potassium permanganate that the reaction is unsatisfactory for preparing a manganese complex under the conditions described above.

It has also been found possible to oxidize the manganous salt in the presence of acetylacetone by use of sodium dichromate as an oxidant in place of potassium permanganate. Under these conditions chromium (III) triacetylacetonate is produced in addition to the corresponding manganese complex, the molar ratio being 3Mn:1Cr. The rate of crystallization of the resulting compounds and their relative solubilities are such that in the present instance the initially precipitated salt is nearly free of the chromium salt. This preparation was carried out in accordance with the following equation:

$$6MnSO_4 + Na_2Cr_2O_7 + 24C_5H_8O_2 + 10NH_3 \rightarrow$$
$$6Mn(C_5H_7O_2)_3 + 2Cr(C_5H_7O_2)_3 +$$
$$Na_2SO_4 + 5(NH_4)_2SO_4 + 7H_2O$$

Analysis of the product showed Mn 15.45% and Cr. 0.14%. This demonstrates that the manganese salt precipitates much more readily, and the yield of the manganese salt corresponded to 82% of that theoretically obtainable.

It will thus be seen that manganese chelated compounds may be readily made by the general method described above. The relatively simple nature of the reaction lends itself to continuous commercial production. While I have in the foregoing described certain specific examples, it will be understood that they are for the purpose of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. The method of preparing a complex chelated derivative of manganese (III) which consists in combining the following ingredients in stoichiometric quantities; manganous sulphate $MnSO_4$ in an aqueous solution; potassium permanganate $KMnO_4$ in an aqueous solution; a diketone selected from the group consisting of acetylacetone $C_5H_8O_2$ and benzoylacetone $C_{10}H_{10}O_2$, with the potassium permanganate solution added gradually and with mechanical agitation and cooling while the pH is controlled between 5.0 and 6.5 by adding an alkali, so that the manganese (III) chelated derivative is formed as a black crystalline precipitate which is then washed and dried.

2. The method of preparing a complex chelated derivative of manganese (III) which consists in combining the following ingredients in stoichiometric quantities; manganous sulphate $MnSO_4$ in an aqueous solution; sodium dichromate $Na_2Cr_2O_7$ in an aqueous solution; a diketone selected from the group consisting of acetylacetone $C_5H_8O_2$ and benzoylacetone $C_{10}H_{10}O_2$, with the sodium dichromate solution added gradually and with mechanical agitation and cooling while the pH is controlled between 5.0 and 6.5 by adding an alkali, so that the manganese (III) chelated derivative is formed as a black crystalline precipitate which is then washed and dried.

3. The method of preparing a complex chelated derivative of manganese (III) which consists in taking bivalent manganese in a manganous salt, dissolving it in an aqueous medium, adding thereto gradually and with agitation a stoichiometric quantity of a diketone and an inorganic oxidant to provide preferential oxidation of the manganous salt in the presence of the diketone, whereby the bulk of the diketone escapes oxidation by virtue of the vigorous reducing properties of the manganous salt in the presence of complex forming compounds and the insolubility of the complex chelated derivative so formed.

4. The method of preparing manganese (III) triacetylacetonate $Mn(C_5H_7O_2)_3$ which consists in combining the following ingredients according to the following stoichiometric reaction:

$$8MnSO_4 + 2KMnO_4 + 30C_5H_8O_2 +$$
$$14NH_3 \rightarrow 10Mn(C_5H_7O_2)_3 +$$
$$K_2SO_4 + 7(NH_4)_2SO_4 + 8H_2O$$

5. The method of preparing manganese (III) triacetylacetonate $(Mn(C_5H_7O_2)_3$ which consists in combining the following ingredients according to the following stoichiometric reaction:

$$6MnSO_4 + Na_2Cr_2O_7 + 24C_5H_8O_2 +$$
$$10NH_3 \rightarrow 6Mn(C_5H_7O_2)_3 + 2Cr(C_5H_7O_2)_3 +$$
$$Na_2SO_4 + 5(NH_4)_2SO_4 + 7H_2O$$

GROVES H. CARTLEDGE.

REFERENCES CITED

The following references are of record in the file of this patent:

FOREIGN PATENTS

| Number | Country | Date |
|---|---|---|
| 289,493 | Great Britain | Apr. 30, 1928 |

OTHER REFERENCES

Urbain et al., Comptes rendu, vol. 129 (1899), pp. 302–305.

Emmert et al., "Ber. deutsch. chem. Ges.," vol. 69B (1936), p. 1319.

"Chemical Abstracts," vol. 38 (1944), col. 297, abstract of original paper by Drehmann in "Z. physik Chem.," 53B, 227–34 (1943).